US006308917B1

(12) United States Patent
Ruff

(10) Patent No.: US 6,308,917 B1
(45) Date of Patent: *Oct. 30, 2001

(54) EJECTION SEAT

(75) Inventor: Stephen Anthony George Ruff, Buckinghamshire (GB)

(73) Assignee: Martin-Baker Aircraft Company, Limited, Uxbridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 09/525,434

(22) Filed: Mar. 14, 2000

(30) Foreign Application Priority Data

Mar. 25, 1999 (GB) ................................................ 9906987

(51) Int. Cl.[7] .................................................... B64D 25/04

(52) U.S. Cl. ..................................... 244/122 AG; 244/141

(58) Field of Search ...................... 244/122 R, 122 AG, 244/121, 141, 160; 280/728.1, 748, 749, 751; 297/464, 465, 487, 488

(56) References Cited

U.S. PATENT DOCUMENTS

| 3,218,103 | * | 11/1965 | Boyce . |
| 3,623,768 | * | 11/1971 | Capener . |
| 3,713,695 | * | 1/1973 | Von Wimmersperg . |
| 3,981,518 | * | 9/1976 | Pulling . |
| 4,081,156 | * | 3/1978 | Ideskar . |
| 4,508,294 | * | 4/1985 | Lorch . |
| 4,592,523 | | 6/1986 | Herndon . |
| 4,667,902 | | 5/1987 | Zenobi . |
| 4,749,153 | * | 6/1988 | Herndon . |
| 5,067,671 | * | 11/1991 | McIntyre et al. . |
| 5,301,903 | | 4/1994 | Aronne . |
| 5,498,022 | * | 3/1996 | Papandreou et al. . |
| 5,676,393 | * | 10/1997 | Rose . |

* cited by examiner

Primary Examiner—Charles T. Jordan
Assistant Examiner—Tian Dinh
(74) Attorney, Agent, or Firm—Fulwider Patton Lee & Utecht, LLP

(57) ABSTRACT

An ejection seat having a blast protection system comprising an inflatable curtain stowed on the ejection seat and deployable to at least substantially envelop an occupant of the seat.

7 Claims, 1 Drawing Sheet

EJECTION SEAT

THIS INVENTION relates to an ejection seat and more particularly to an ejection seat having a blast protection system.

Ejection seats are commonly used in military aircraft where the risk of aircraft failure or combat damage is high. Ejection seats allow the aircrew to escape from stricken aircraft and typically provide a safe and reliable means of escape.

Ejection seats have long been fitted with arm and leg restraint systems which serve to secure the arms and legs of the aircrew in a safe position during ejection. During normal flight the aircrew's arms and legs must clearly be allowed to be free in order to control the aircraft. However, during ejection it is important to move the arms and legs of the aircrew into a safe position and secure the arms and legs into that position to avoid injuries which can be caused either by limbs flailing and hitting the side of the cockpit or as a result of the inertial forces which would be experienced by outstretched limbs. As the ejection seat leaves the aircraft, the occupant of the seat experiences wind blast due to the forward speed of the aircraft which will cause further limb flailing if the occupant's limbs are not restrained. As well as injuries to limbs, neck injuries are also a hazard. Thus, some ejection seats provide neck restraint systems which secure the head of the aircrew into a safe position during ejection.

One major disadvantage of presently available arm and leg restraint systems and neck restraint systems is that the aircrew are required to don or manually connect themselves to the restraint systems. The difficulty of this task is compounded by the fact that the aircrew are likely to be wearing cumbersome NBC protective clothing. Assistance is therefore usually required in order for the aircrew to be properly connected to the restraint system.

During ejection, the combination of the aircrew and the ejection seat does not present a very aerodynamic profile and therefore suffers from a fairly high coefficient of drag. Thus, the lower the mass of the occupant of the ejection seat, the greater the deceleration which will be experienced during ejection. For this reason, lower mass occupants cannot safely be ejected at high speeds and the escape envelope of higher mass occupants is limited.

It is an object of the present invention to seek to ameliorate or overcome the problems associated with aforementioned problems associated with ejection seats and restraint systems therefor.

Accordingly, one aspect of the present invention provides an ejection seat having a blast protection system comprising an inflatable curtain stowed on the ejection seat and deployable to at least substantially envelop an occupant of the seat.

Figure 1:
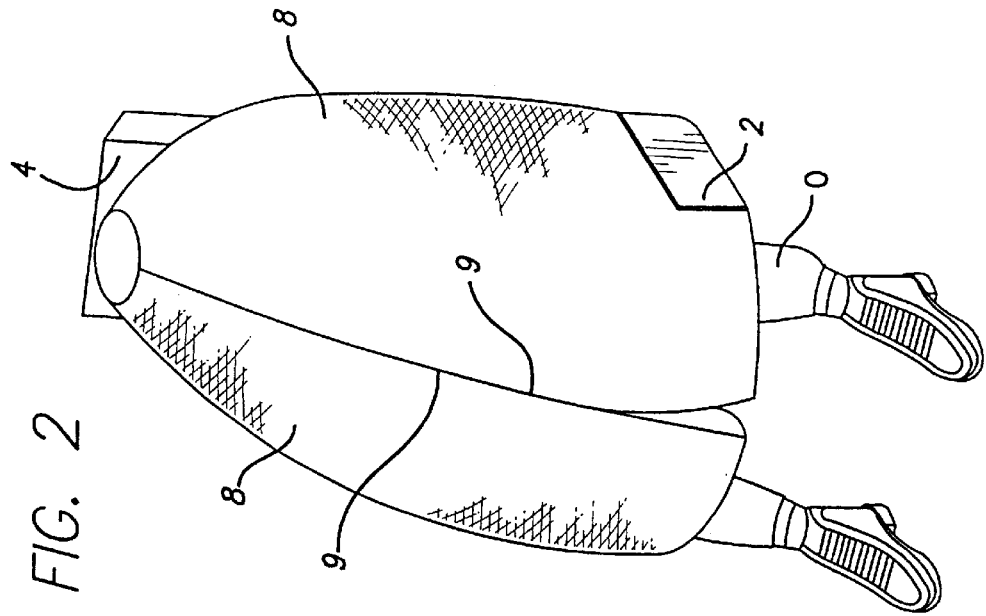
Figure 2:
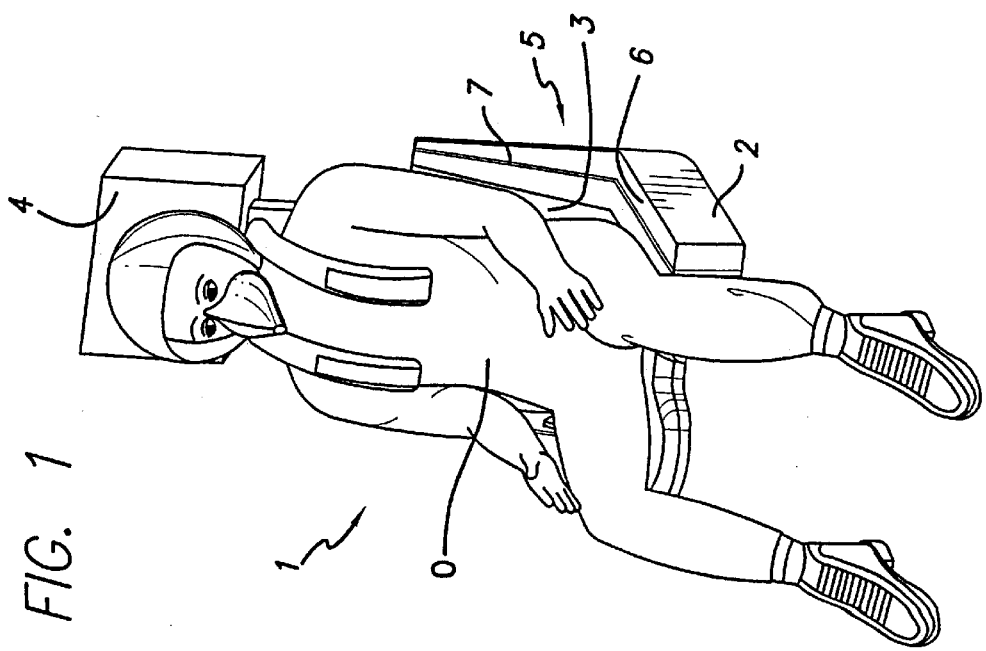

In order that the present invention may be more readily understood, embodiments thereof will now be described, by way example, with reference to the accompanying drawings, in which:

FIG. 1 is a perspective view of an ejection seat embodying the present invention and an occupant seated in the ejection seat; and FIG. 2 is a perspective view of the ejection seat of FIG. 1 with a blast protection system deployed.

Referring to FIG. 1, an ejection seat 1 embodying the present invention comprises a substantially horizontal seat portion 2, a reclined, near vertical, back support 3, a head rest 4 and a blast protection system 5. Other than the incorporation of the blast protection system 5, the ejection seat 1 is based upon the design of conventional ejection seats as is the mounting means by which the ejection seat is fitted to the aircraft. An occupant O is shown seated in the ejection seat 1.

In the illustrated example shown in FIG. 1, the blast protection system comprises a pair of elongate containers 6 which are fitted to opposite sides of the ejection seat and which substantially follow the contours of the side of the ejection seat 1, i.e. along the front edge of the seat portion 2, along the horizontal seat portion 2 and then along the back support 3.

The container 6 has an elongate slot 7 formed along its length. With respect to the ejection seat 1, the slot 7 faces forwardly.

Referring now to FIGS. 1 and 2. each container 6 includes a pyrotechnic charge, a firing mechanism (not shown) and an inflatable curtain 8. The inflatable curtain 8 is tightly folded and packed within the container 6 so as to take up the minimum amount of space.

An ejection control system controls the ejection sequence and thus controls the firing of the ejection seat from the aircraft and synchronises removal of the canopy by explosive cutting or other means with the ejection of the seat so as to minimise the possibility of impact between the canopy and the seat occupant. In an ejection seat embodying the present invention, the ejection control system is also operable to send a firing signal to the firing mechanism within each of the containers 6 so that the blast protection system can be deployed during the ejection sequence. The firing signal triggers the firing mechanism in each container 6 thereby igniting the pyrotechnic charge. The pyrotechnic charges rapidly produce combustion gases which fill the respective inflatable curtains 8 forcing the curtains 8 out of the respective elongate slots 7 in the containers 6. The curtains 8 take approximately 20 milliseconds to inflate fully.

In the deployed condition shown in FIG. 2, the curtains 8 project from the elongate containers 6 and envelop the seat occupant, the leading edges 9 of the two curtains 8 meeting in the middle. In this manner, the limbs of the occupant and the occupant's head are restrained in safe positions within the curtains 8 and are protected from injury during the ejection.

The inflatable structure defined by the two curtains 8 is substantially rigid when inflated. The rigidity of the structure can be improved by incorporating an inflatable framework into the curtain. Upon inflation, the inflatable framework within the curtain, including, for example, inflatable ribs, serves to define the shape of the inflatable structure and add strength thereto.

Preferably, the leading edges 9 may also be provided with co-operating attachment means to assist the two edges to remain secured together when the two edges come into contact with one another. For example, a hook and loop fastening system can be used along the edges of the two curtains 8.

In the above described example, the blast protection system is described as being stowed along the sides of the ejection seat for deployment forwardly and around the occupant of the seat. Other stowage and deployment configurations are possible such as, for example: side stowage in which a single curtain is deployed from one side only of the seat, preferably for attachment to the opposite side of the seat; and top stowage in which the blast protection system is stowed above the head of the occupant of the seat and can be deployed downwardly as a single curtain to envelop and protect the occupant.

The top stowage and deployment configuration has an advantage that the curtain is deployed downwardly as a single unit and thus, during ejection, the flow of air around the inflated structure and the ejection seat would maintain the inflated structure in the correct position around the seat occupant, preventing any limb flailing or neck injury. Furthermore, the top stowage and deployment configuration does not necessitate the edge of a curtain being deployed having to be attached to the edge of another curtain or a part of the ejection seat.

The provision of an inflatable structure around the occupant of the seat also serves to provide a lower coefficient of drag for the resultant structure than that which can be obtained for a conventional combination of an ejection seat and occupant. The reduction in the coefficient of drag of the resultant structure means that lower mass occupants can be more safely ejected at speeds currently deemed unsafe and existing aircrew will have their escape envelope increased.

Rather than using a pyrotechnic charge to produce combustion gases to inflate the curtain, a supply of a compressed low molecular weight gas may be used to improve inflation times. The supply of compressed gas would preferably be incorporated in the container 6 housing the inflatable curtain 8 such that inflation time is not wasted in moving the gas from the supply of compressed gas to the inflatable curtain. A pyrotechnic charge could still be used to open the supply of compressed gas.

The container may be provided with a pre-weakened area along its length instead of the slot 7. The pre-weakened area is breakable by the deploying inflatable curtain to allow the curtain to burst through the pre-weakened area.

A hinged closure may also be used instead of a slot 7 or pre-weakened area, the closure hinging open to allow the inflatable curtain to deploy.

The inflated structure comprising the blast protection system may remain inflated or can be intentionally deflated after ejection. In the case where the blast protection system remains inflated, there is the possibility of using the inflated structure as a form of life raft.

What is claimed is:

1. An ejection seat having a blast protection system comprising an inflatable curtain stowed on the ejection seat and deployable to at least substantially envelop an occupant of the seat, the ejection seat having two sides and the inflatable curtain being stowed along one side of the ejection seat for deployment across the front of the ejection seat from the one side toward the other side, and wherein attachment means are provided to attach an edge of the inflatable curtain to the other side of the ejection seat after deployment.

2. An ejection seat according to claim 1, wherein a further inflatable curtain is stowed along the other side of the ejection seat for deployment across the front of the ejection seat toward the one side.

3. An ejection seat according to claim 2, wherein attachment means are provided to attach an edge of the inflatable curtain to an edge of the further inflatable curtain.

4. An ejection seat according to claim 1, wherein the inflatable curtain is stowed in a container attached to the ejection seat.

5. An ejection seat according to claim 4, wherein the container is provided with a slot through which the inflatable curtain can be deployed.

6. An ejection seat according to claim 4, wherein the container is provided with a pre-weakened area which is breakable upon deployment of the inflatable curtain to allow the curtain to burst through the pre-weakened area.

7. An ejection seat having a blast protection system comprising an inflatable curtain stowed on the ejection seat and deployable to at least substantially envelop an occupant of the seat, the ejection seat having two sides and the inflatable curtain being stowed along one side of the ejection seat for deployment across the front of the ejection seat from the one side toward the other side, wherein a further inflatable curtain is stowed along the other side of the ejection seat for deployment across the front of the ejection seat toward the one side, and wherein attachment means are provided to attach an edge of the inflatable curtain to an edge of the further inflatable curtain.

* * * * *